Figure 2:
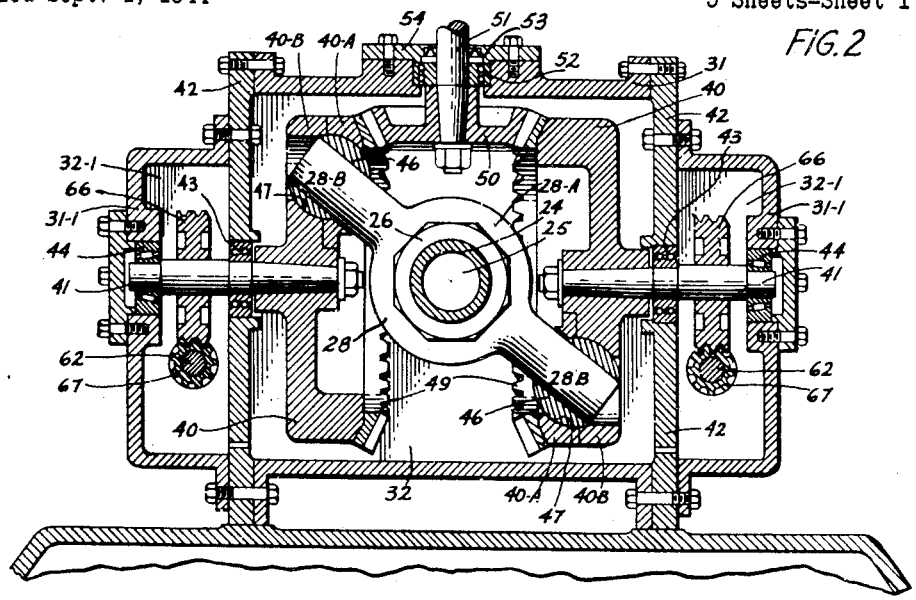

Sept. 6, 1949.  J. A. HARDMAN  2,480,854

MOTION TRANSFORMING MECHANISM

Filed Sept. 1, 1944  5 Sheets-Sheet 1

Inventor:
J. A. Hardman,
By
Philip A. Mallinckrodt.
Attorneys.

Sept. 6, 1949. J. A. HARDMAN 2,480,854
MOTION TRANSFORMING MECHANISM
Filed Sept. 1, 1944 5 Sheets-Sheet 2
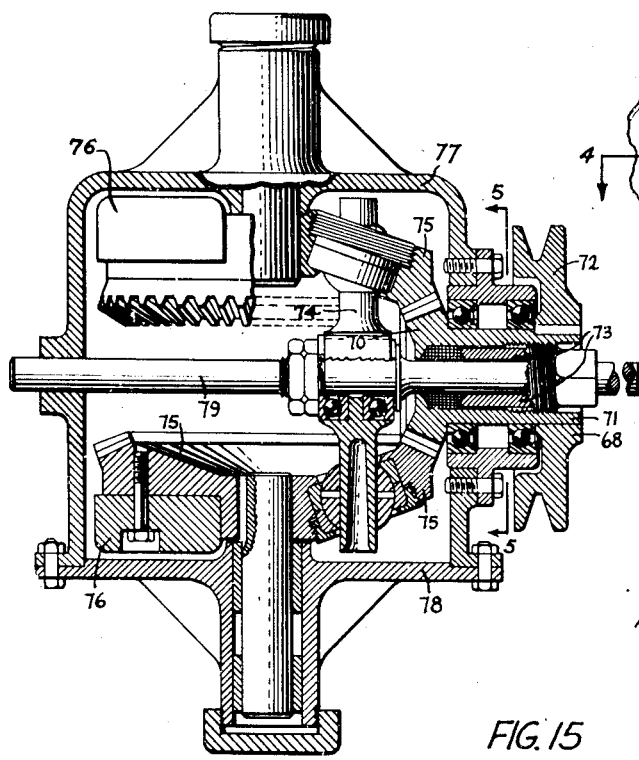
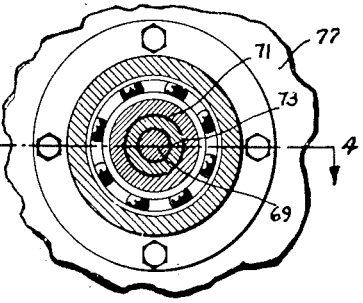
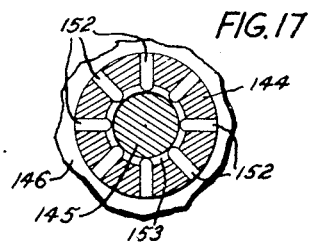
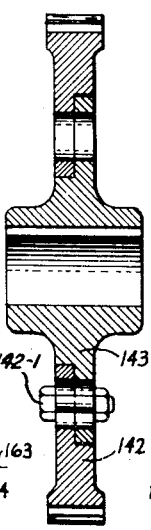
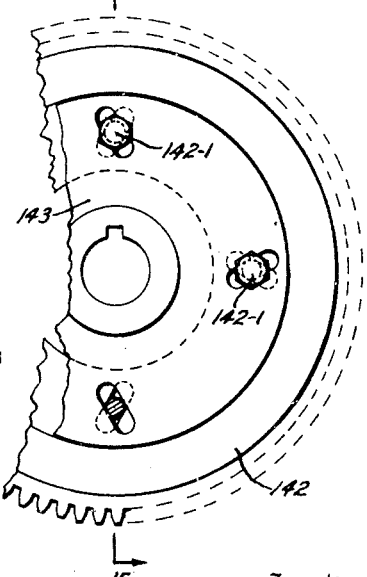
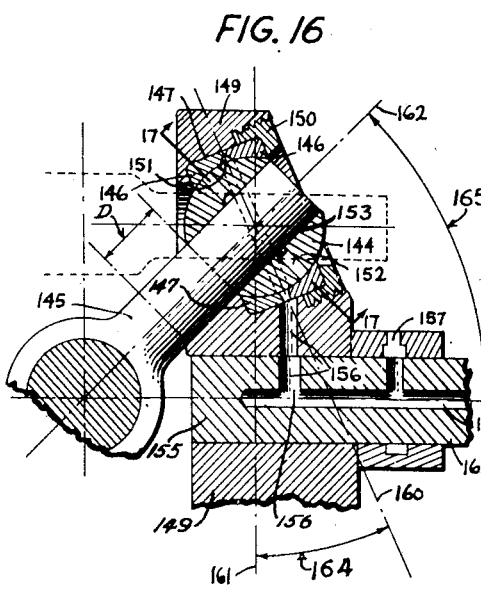
Inventor:
J. A. HARDMAN,
Attorneys.

Sept. 6, 1949.                    J. A. HARDMAN                    2,480,854
                          MOTION TRANSFORMING MECHANISM
Filed Sept. 1, 1944                                         5 Sheets-Sheet 3
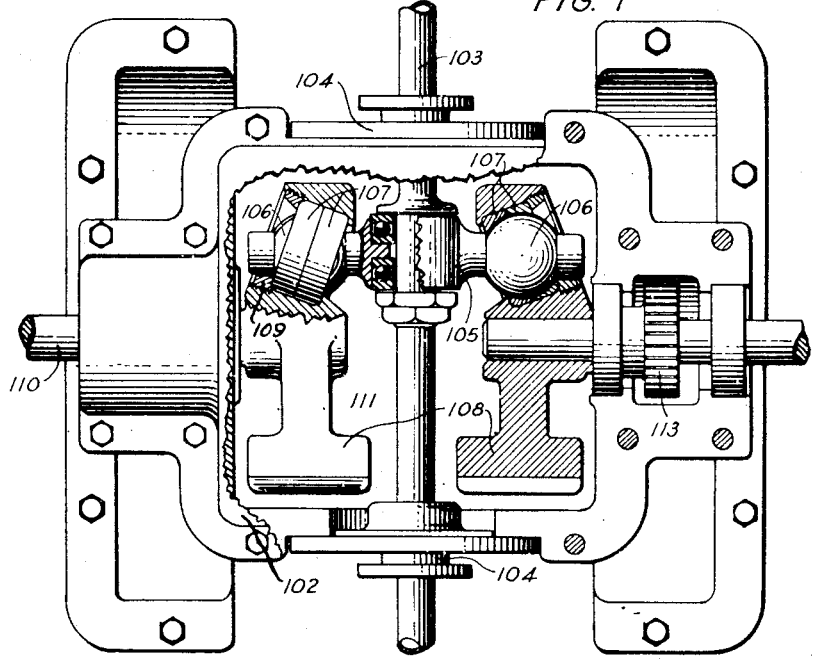
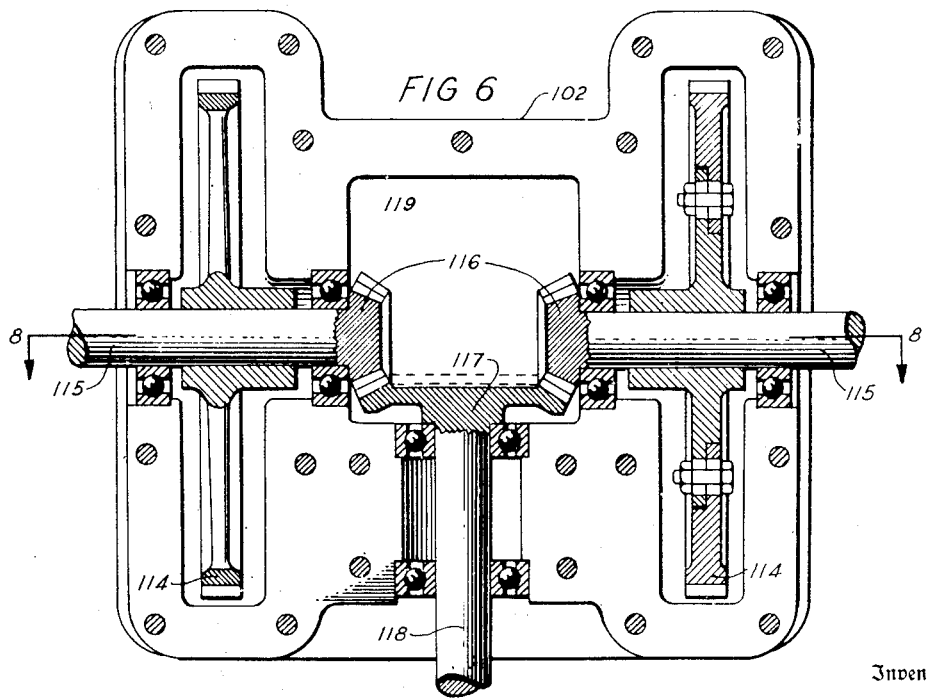
Inventor:
J. A. HARDMAN,
By H. Mallinckrodt and
Philip A. Mallinckrodt.
Attorneys.

Sept. 6, 1949.                    J. A. HARDMAN                    2,480,854
                           MOTION TRANSFORMING MECHANISM
Filed Sept. 1, 1944                                          5 Sheets-Sheet 4
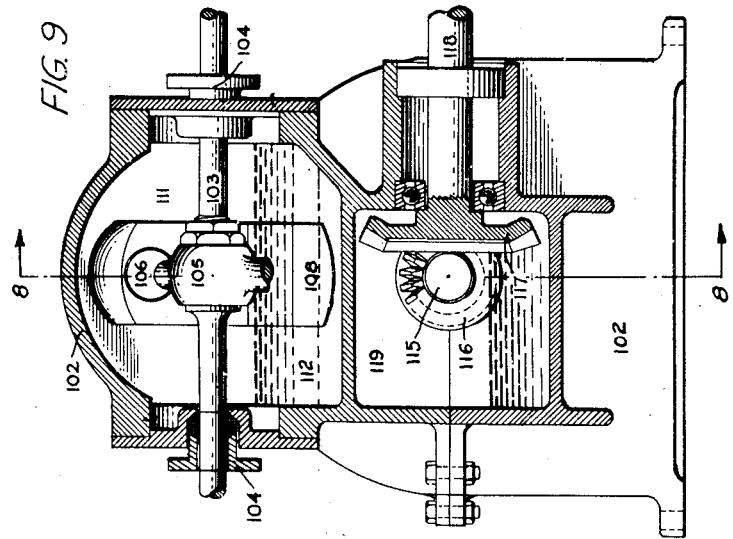
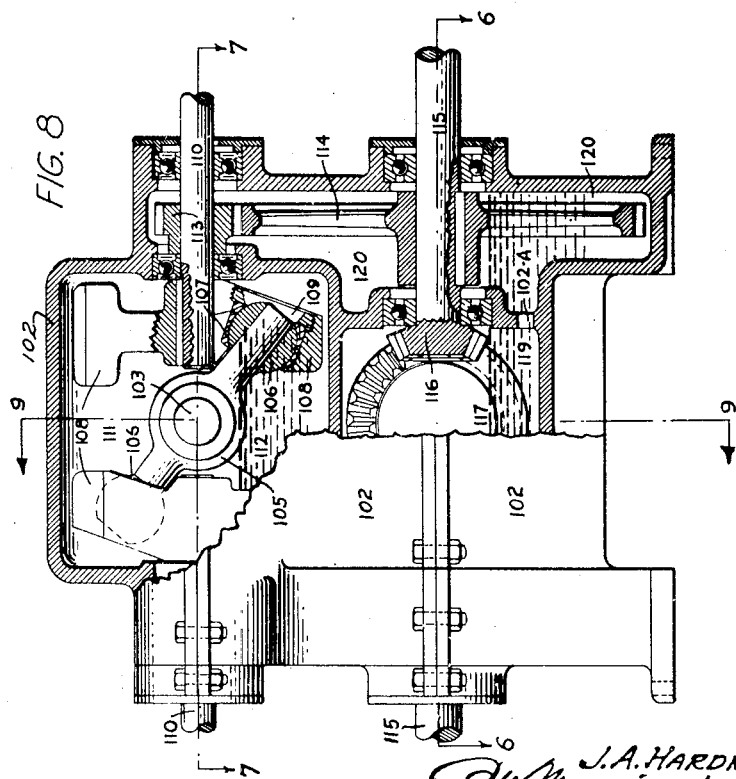
Inventor:
J. A. HARDMAN,
By
Philip A. Mallinckrodt
Attorneys Sept. 6, 1949.   J. A. HARDMAN   2,480,854
MOTION TRANSFORMING MECHANISM
Filed Sept. 1, 1944   5 Sheets-Sheet 5

Inventor:
J. A. HARDMAN,
By
Attorneys.

Patented Sept. 6, 1949

2,480,854

UNITED STATES PATENT OFFICE 2,480,854

MOTION TRANSFORMING MECHANISM

James A. Hardman, Logan, Utah, assignor to Utah Scientific Research Foundation, Logan, Utah, a corporation of Utah Application September 1, 1944, Serial No. 552,302

22 Claims. (Cl. 74—50)

This invention relates to mechanism for transforming or converting reciprocative rectilinear motion into rotary motion, or vice versa.

According to the invention a certain peculiar mechanical movement is combined with mechanical elements which stabilize its action and render it capable of meeting the exacting demands of many modern engineering applications.

Embodiments of the invention comprise, as the mechanical movement, a pair of rotatable elements or rotors arranged respectively at opposite sides of and in operative conjunction with a reciprocative shuttle, the shuttle and the rotors being suitably interconnected with each other for interdependent reciprocative and rotative motion by means of arm elements that project rigidly from the shuttle and engage the rotors at points eccentric with respect to the common axis of rotation of the rotors.

With this mechanical movement is combined gearing which interlocks the two rotors together and constrains them to move in positive and absolute synchronism, effectively equating all stress and strain between the two. This, together with a system of counterbalancing, results in smooth and balanced operation of any machinery to which the motion converting mechanism is applied.

Because of their reversely eccentric connections with the shuttle, the two rotors turn in opposite directions, these directions, however, being unified by means of the intergearing. The basic consideration is that the bi-directional motion of the rotors is transformed into unidirectional motion, or that unidirectional motion applied to the above mechanical movement is transformed into bi-directional motion in its application to the rotors.

Among the principal objects of the invention are the following:

To attain a high degree of efficiency in transforming reciprocatory rectilinear motion into rotary or circular motion, and vice versa.

To so arrange and construct the mechanism that it shall be simple and economical to manufacture and operate.

To attain a substantially perfect balance.

To eliminate power-absorbing and stress-creating side thrusts in the transformation of reciprocating motion into rotary motion, or vice versa, especially in connection with reciprocating types of engines and/or fluid compressors, or similar devices, and to reduce to a minimum the number of bearings and jointed members required in conventional engines.

To so intergear the power input and power output elements that the directional relationship between them shall be adapted to any particular purpose.

To intergear the input and output power elements so that power applied at a number of points can be unified and delivered at the point of application of a single power output.

To balance the various elements of the mechanism to insure smooth, harmonious action.

To provide a housing or housings within which the various intergeared elements have their action either in a single group or in separate groups, thereby making it possible to apply lubricants to the individual groups that are best adapted to certain purposes, for example, those combinations of elements which have relatively high speeds of rotation can be supplied with lubricants which are suited to those speeds, while other elements are separately housed in order that other lubricants adapted to their particular speed can be separately applied.

To so arrange the various elements that the rotative power output can be delivered at a number of different points or on the other hand, that the rotative power input can be applied at a number of different points.

To so arrange the rotative elements that the rotative output can have its axis of rotation coincident with the line of reciprocation of the reciprocaing elements.

To provide means whereby a system of interlocked gearing is adjusted sufficiently to prevent deadlocking because of slight though unavoidable inaccuracies of construction.

To prevent angular displacement of the reciprocating elements about the line of reciprocation, if necessary.

To so arrange and proportion a universal connection between the shuttle arms and the rotors that the maximum possible bearing surface between the two can be realized.

To so arrange the universal connection between the shuttle arms and the rotatable elements that adequate lubrication and equalized wear are obtained.

To make the maximum angle which the shuttle arms describe with the axial median plane thereof determine the angle which the median plane of the universal connection makes with the shuttle arm.

Other important objects will become apparent hereinafter.

This application is a continuation-in-part of the one filed by me September 29, 1942, Serial No. 460,062, now abandoned, entitled Motion transforming mechanism.

Figure 1:
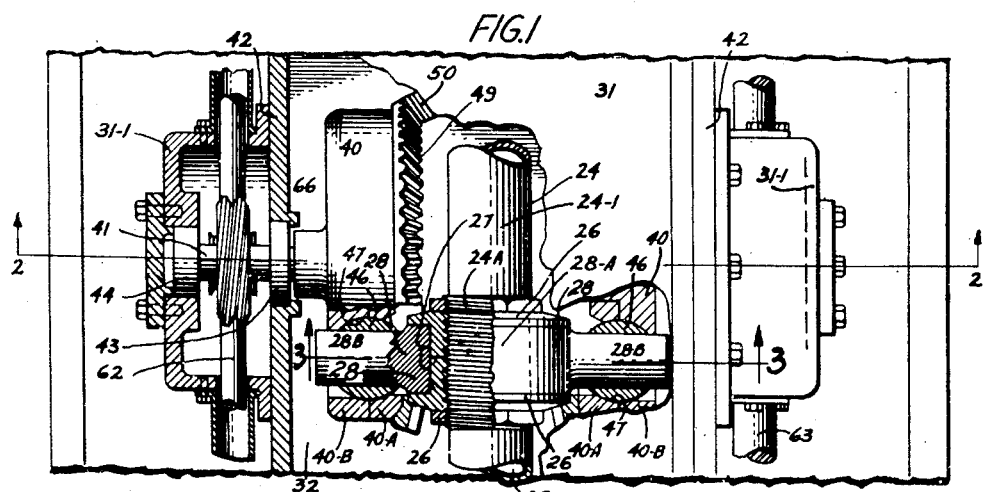
Figure 3:
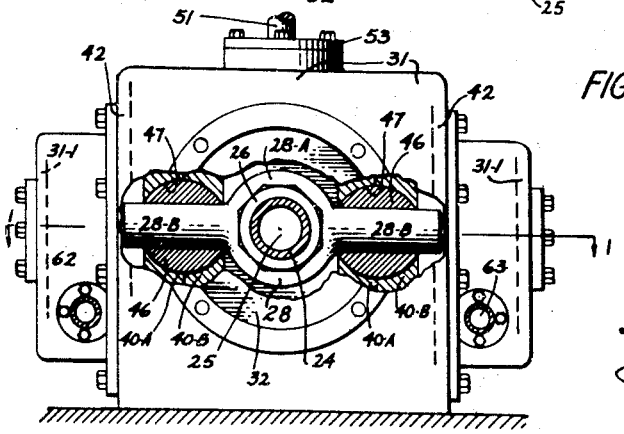
Figure 10:
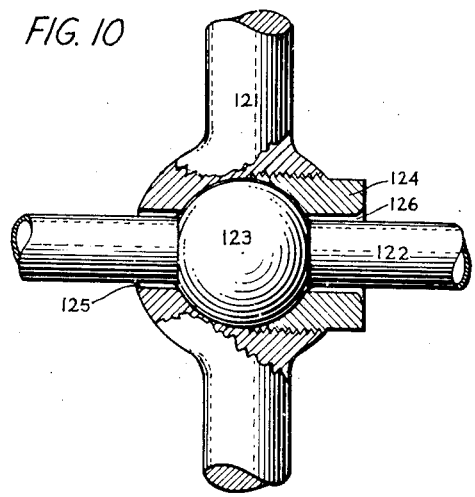
Figure 11:
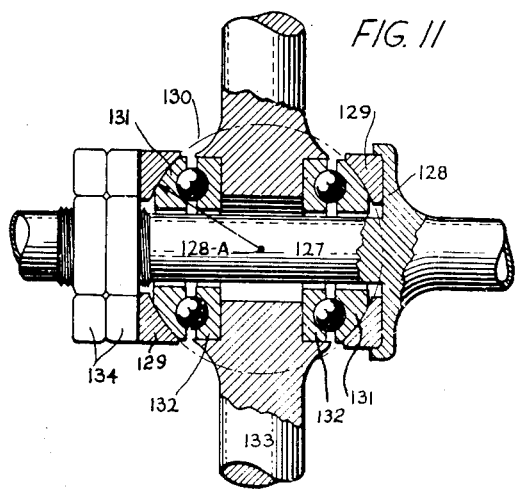
Figure 12:
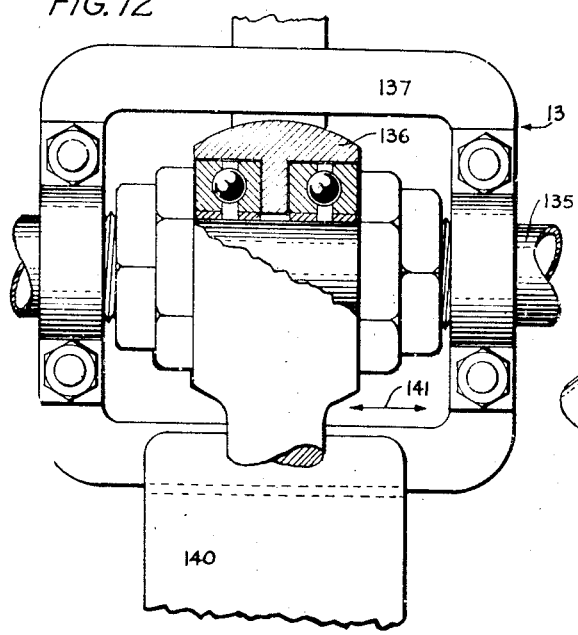
Figure 13:
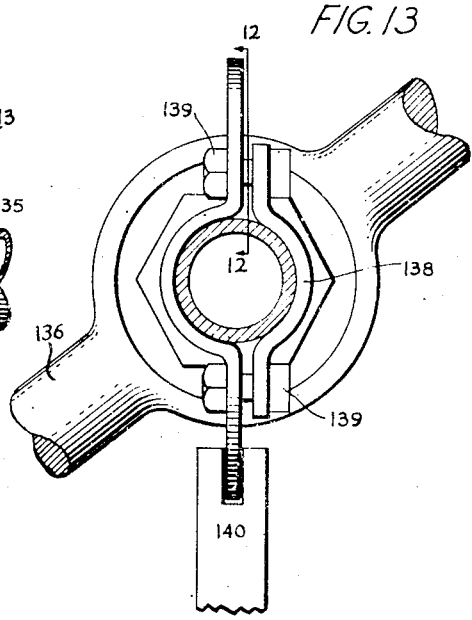

In the accompanying drawings which illustrate several embodiments of the invention, Fig. 1 represents a plan, partially in section taken on the line 1—1 in Fig. 3, drawn to an enlarged scale and showing the invention as applied to a particular purpose;

Fig. 2, a vertical section taken on the line 2—2 in Fig. 1, but showing the shuttle in an alternate position;

Fig. 3, an elevation, partially in section taken on the line 3—3 in Fig. 1, but drawn to a reduced scale;

Fig. 4, a plan, partially in section taken on the line 4—4 in Fig. 5, of another construction;

Fig. 5, a section taken on the line 5—5 in Fig. 4;

Figs. 6 and 7, horizontal sections taken respectively on the lines 6—6 and 7—7 in Fig. 8;

Figs. 8 and 9, vertical sections taken respectively on lines 8—8 and 9—9 in Figs. 6 and 8;

Fig. 10, a fragmentary detail showing means for effecting slight adjustments between the shuttle and the reciprocating rod;

Fig. 11, a fragmentary detail showing means for permitting greater amounts of adjustment between the shuttle and the reciprocating rod than is the case in the construction of Fig. 10;

Fig. 12, a fragmentary elevation, partially in section taken on the line 12—12 in Fig. 13, showing means for preventing angular movement of the reciprocating rod;

Fig. 13, a fragmentary elevation, looking in the direction of the arrow 13 in Fig. 12;

Fig. 14, a fragmentary elevation showing means whereby a system of interlocked gearing is adjusted to prevent interference between individual gears because of slight, though unavoidable, inaccuracies of construction;

Fig. 15, a section taken on the line 15—15 in Fig. 14, and

Fig. 16, a fragmentary section showing means for applying pressure lubrication to a ball and socket joint.

Fig. 17 is a section taken on the line 17—17 in Fig. 16 showing the lubricant passages through the ball.

Referring to the drawings, Figs. 1, 2 and 3 show a simple form of the invention as adapted for use in conjunction with a reciprocating internal combustion engine, for example, the one forming the subject of my co-pending application for United States patent filed September 1, 1944, Serial No. 552,303, now abandoned. Here, the numeral 124 indicates the piston rod of the engine. This piston rod may or may not have a passage 25 extending therethrough, one purpose of the passage being to lighten the rod. Rotatably mounted on the rod 24 is a shuttle 28 that is held against longitudinal movement along the rod by means of two flanged bushings 26 internally threaded for screwing upon the threaded portion 24a of the rod. The bushings 26 together form a circular runway 27 within which the hub portion 28a of the shuttle has its bearing. The shuttle is preferably in the form of a spider having two oppositely directed and axially aligned cylindrical arms 28b extending radially and rigidly from the hub 28a thereof. The purpose in this instance is to transform the rectilinear reciprocatory movement of the rod 24 into rotary motion. To this end the shuttle 28 is the direct connecting link between the reciprocatory means and the rotary means.

The rotary means in this instance is in the form of a pair of flywheels 40 serving as rotors disposed on opposite sides of the shuttle 28 and rigidly mounted on the respective power take-off shafts 41, the latter extending through intermediate or partition walls 42 of a housing 31 and also through the end walls 31—1 thereof. The shafts are advantageously journaled in the respective radial ball bearings 43 mounted in the partition walls 42 and in the respective tapered roller bearings 44, the latter being mounted in the end walls 31—1.

The shuttle arms 28b are eccentrically connected to the respective rotors 40 by means of ball and socket joints consisting of the balls 46 and the sockets 47, the latter being formed in the respective rotors.

In operation, when the piston rod 24 is reciprocated, the back-and-forth movement of the shuttle 28 within the chamber 32 causes the shuttle to oscillate within its runway 27 and about the piston rod 24, acting in crank fashion to rotate the respective rotors 40 in mutually opposite directions. During the reciprocating and oscillating motion of the shuttle 28 there is a one-half rotation of each rotor 40 for each stroke of the rod 24, the rotation of the two rotors being, of course, in opposite directions. In this instance, the engine being considered as of the internal combustion type, it is convenient to use motion from the rotor shafts 41 to drive the respective tappet shafts 62 and 63 of the engine by means of gears 66 and 67. The fact that the shafts 41 rotate in opposite directions is immaterial for this purpose.

In order to secure the desired equal angular velocity of the rotors and driven shafts 62 and 63, it is necessary that the two rotors 40 be intergeared with each other and this is effected by means of a bevel gear or pinion 50 which intermeshes with the gear rings 49 of the rotors. The gear 50 is rigid with respect to shaft 51, thereby causing the output power motion thereof to be unidirectional in character. Anti-friction bearings 52 and 53 support the shaft 51.

In the construction just described it is to be noted that the shuttle, rotors and other moving parts are located inside the housing 31, thus forming a lubricant-retaining chamber which may be termed a shuttle case.

In the construction illustrated in Figs. 4 and 5 the rotative input or output has its axis coincident with the center line of the reciprocative element. In these figures the numeral 68 indicates the rotative input or output element and the numeral 69 the reciprocative element. The rotative element 68 in this instance may be composed of a bevel pinion 70 on whose hub or sleeve portion 71 is rigidly mounted a grooved pulley 72. The bevel pinion 70 is packed on the reciprocative element 69 by means of a gland member 73. A shuttle 74 is mounted on the reciprocative element 69 in a manner similar to that described in connection with the foregoing construction, that is to say, the shuttle has an oscillating motion about the center line of reciprocation but has no longitudinal movement apart from the reciprocative element 69. The bevel pinion 70 receives its motion from two bevel gears 75 which are similar to each other but which rotate in mutually opposite directions similar to the motion of the rotors in Figs. 1 to 3. In this instance the rotors consist of the bevel gears 75 which are counterweighted at 76 to substantially balance the ball and socket assembly and further, so that the combined counterbalancing of the two rotors 75 will also serve to counterbalance the total reciprocative load of the reciprocative element 69 and its appurtenances. A casing composed of the main body 77 and its removable head 78 serves to form an oil-tight casing within which certain portions at least of the rotors, shuttle and motion input and motion output elements have their working paths. Obviously, in this construction the axis of rotation of the rotatable input or output element coincides with the center line of reciprocation of the reciprocative element.

A somewhat more complicated form of the invention is shown in Figs. 6 to 9 where the numeral 102 indicates a housing, in the upper part of which a rod 103 is reciprocatively held in stuffing-box bearings 104. A shuttle 105 is mounted on the rod 103 so as to have oscillatory motion about the rod, but is held against longitudinal movement along the rod. The arms of the shuttle have journaled thereon the ball members 106 which in turn are journaled in the respective sockets 107, Fig. 7. These sockets may be formed in numerous different ways, in the present instance by means of two similar half rings retained in cavities of the rotors 108 by means of a ring-nut retainer 109. The rotors are rigidly mounted on the respective shafts 110, these being held in suitable bearings mounted in the casing or housing 102. The chamber 111 in which the rotors and the shuttle are mounted is preferably oil-tight so as to provide a lubricating bath in which the moving parts are at least partially immersed, as indicated at 112. The shafts 110 carry the rigidly mounted pinions 113, Fig. 8, that mesh with the respective gears 114, these in turn being rigidly mounted on the shafts 115. These shafts are journaled in the casing in a manner similar to that of shafts 110. The shafts 115 at the inner ends terminate in the integral bevel pinions 116, these pinions being intermeshed with the bevel gear 117. The gear 117 in this instance is integral with the principal power takeoff shaft 118, and this shaft is carried in bearings which also are supported in the housing 102. The gears 116 and 117 are disposed in chamber 119 which is in communication with chamber 120 by means of openings 102a. The chamber 120 serves to house the gears 114 together with the intermeshed pinions 113.

In the construction just described the gears form an interlocked train. One end of the train is locked by the shuttle and the two rotors, while the other end is locked by the bevel gear 117 and the two intermeshed pinions 116.

The construction, Figs. 6 to 9, possesses considerable novelty and utility in that the rod 103 may serve as a high-speed power-input element, thereby causing the shuttle connections and gears in the chamber 111 to also move at high speeds. For this reason it is desirable that these parts shall be provided with a lubricant of different viscosity from that of the lubricant in the chambers 119 and 120, since in the present instance the gears in these two chambers move at a speed considerably less than those in chamber 111.

A characteristic of the invention is that the power and motion delivered through the shuttle is divided and taken off in two lanes, the motion in these lanes being equalized and balanced. It is to be observed, however, that the particular transmission members which function in these lanes are subject to a great variety of design so that the two embodiments which have been described are merely indicative of some of the variations to which resort may be had. For example, the first transmission members in the two lanes are the rotors that receive their motion from the shuttle. These rotors in the instance of construction in Figs. 1 to 5 are in the form of wheels, while in the construction in Figs. 6 to 9 the rotors are in the form of arms. Furthermore, in Figs. 1 to 3, the power is taken off along an axis of rotation in the plane of reciprocation and normal to the line of reciprocation, while in Figs. 4 and 5 the axis of the rotatable take-off element coincides with the center line of reciprocation.

Obviously, in any construction of the apparatus of the invention, a reciprocable element may be used for the power input and a rotatable element for the power output, or vice versa. Any specific explanation herein relating to the illustrated constructions are merely by way of example.

For use in conjunction with the various typical embodiments that have hereinbefore been described, it is desirable to provide specifically refined details of construction, a few of which are illustrated in Figs. 10 to 17. With respect to these details, Figs. 10, 11, 14 and 15 are directed more particularly to the provision of means for accomplishing certain adjustments that are necessary to obtain satisfactory results in the construction and operation of the mechanism of the invention.

In Fig. 10, one manner of providing a limited adjustment between the reciprocating rod and the shuttle is shown for use in overcoming deadlocking of interlocked gear trains because of small but unavoidable inaccuracies in shaping the different parts. For example, one or the other of the pinions 116 and the gear 117 of Figs. 8 and 9 are liable to deadlocking because of even slight inaccuracies anywhere in the intergeared members. To provide for overcoming that condition a shuttle 121, Fig. 10, is mounted on the rod 122 by means of a ball and socket joint, in which the ball 123 is integral with the rod 122, and the socket forms an integral part of the shuttle. The ball 123 is held in the socket by means of a threaded member 124. Clearances are provided at 125 and 126 which permit a limited movement between the shuttle and the rod.

In Fig. 11 a device for a similar purpose, though having a greater range of adjustment, is provided. In this case the rod 127 is shouldered at 128 to receive a ring 129 that is cupped in conformity with a spherical surface having a meridian circle which is indicated at 130 and having its center at 128a. The ring 129 forms a seat for one race of an anti-friction bearing of which the other race 132 is fixed in the hub of the shuttle 133, the assembly being held together by a lock nut at 134.

The devices of both Figs. 10 and 11 also provide means for equalizing or distributing the load on the bearings, since the bearings are self-aligning. In addition to the devices of Figs. 10 and 11, means for correcting certain constructional inaccuracies by slightly adjusting the angular position of the toothed rim of a gear relative to the hub is provided by the device shown in Figs. 14 and 15 where the numeral 142 indicates a rim portion carrying the teeth of a gear and 143 indicates the hub portion of the same gear. The rim portion is separated from the hub portion in this example by means of a circular joint consisting of halved flanges rabbeted together so as to allow angular movement between the rim portion and the hub portion. This angular adjustment takes care of relatively small variations and at the same time provides a positive connection between the rim portion and the hub portion. This positive connection is effected by means of cooperating slotted portions in the two rabbeted halved flanges, the cooperating slots in these portions crossing each other so as to form passages through the two flanged portions to admit fastenings such as bolts 142—1. A slight radial movement of the bolts causes a correspondingly slight variation in the angular position of the rim portion relative to the hub portion, but at the same time insures a positive bearing against the bolt simultaneously for both the rim portion and the hub portion. The slotted connections are spaced around the circular flanges so as to maintain the gear in perfect balance relative to its rotative axis. When the bolts are tightened, the rim portion and the hub portion are rigidly connected to each other and produce the effect of an integral structure.

For some uses of the invention it is desirable to prevent any tendency of the rod to turn or drift angularly abouts its line of reciprocation. The device shown in Figs. 12 and 13 accomplishes this purpose. In these figures a rod 135 that carries the shuttle 136 is fitted with a frame 137 that extends around the shuttle hub substantially in an axial plane of the rod. This frame is provided with a cap 138 by means of which the frame is clamped tightly on the rod, for example, by bolts 139. One portion of the frame 137, in this instance the lower portion, may be engaged by a stationary guide 140 in which the frame 137 is slidable. Thus when the rod 135 is reciprocated, the frame moves back and forth through the guide as indicated by the double-pointed arrow 141 in Fig. 12, and is thereby prevented from having any rotative drift about the line of reciprocation of the rod.

An important part of the invention has to do with the socket mountings for the ball elements of the articular connections between the shuttle arms and the rotors. This also involves special means for lubricating the surfaces between the shuttle arms, the balls and the sockets. An example of a novel ball and socket joint is shown in Fig. 16 where the numeral 144 indicates a ball rotatably and slidably mounted on a shuttle arm 145, the ball being disposed so as to have a gyratory motion in the socket formed by the two bearing collars 146. These bearing collars are held in a recess 147 formed in rotor 149 and are secured in place by means of a ring nut 150. The bearing collars are chamfered inwardly of their common plane of separation to form an oil groove 151. The ball 144 is provided with a plurality of oil passages 152, these being preferably radial in disposition. The oil passages 152 are in communication with an interconnecting annular groove 153 formed in the bore of the ball. It is frequently desirable that lubricant be supplied to the ball and socket joint under forced feed, this being accomplished, for example, through a passage 154 formed in the shaft portion 155 of the rotor. This passage has a branch 156 that communicates with the annular oil groove 151. An inlet pipe 157 extends to any suitable point of lubricant supply (not shown) in accordance with conventional lubricating practice.

A basic consideration of the invention is to provide the maximum possible area for the bearing surface between a ball and its socket. To accomplish this provision it is necessary that the angle 164 between the median plane 160 passing through the ball and socket and a perpendicular 161 dropped from the center of articulation at the midpoint of reciprocation, be substantially equal to one-half the angle 165 existing between the center line 162 of the shuttle in its mid-position of reciprocation and a horizontal plane 163 determined by the intersection of the center line of shuttle reciprocation with the axis of rotation of the rotors, that is to say, with the rectilinear prolongation of the corresponding rotor axis. Another advantage of the angles 164 and 165 is that the bearing collars 146 are symmetrical. These angles are the only ones which permit of a rational construction of the rings 147 and the recess in which they are held.

The dimension indicated (D) represents the length of travel of the shuttle arm through the ball during a half-stroke of the shuttle or during a quarter-turn of the rotor.

It will be readily understood by skilled engineers that the flexibility of the apparatus of the invention makes it adaptable advantageously in many different power applications and power derivatives, especially since a plurality of power input or output points are provided.

Since reciprocative motion is characteristically bi-directional and rotary motion characteristically uni-directional, it follows that in transforming one into the other two separate and distinct motion lanes are always involved. A feature of the invention in both cases relates to the equalizing of the motions in these lanes by means of intergearing the two lanes, one with the other.

This equalization of the motions of the rotors in the two lanes, acting in conjunction with the oscillating shuttle mounted on the reciprocable element, means that side thrust upon the reciprocable element, and, coincidently, side thrust exerted by the reciprocable element on its mounting, are eliminated, this being true because the lateral forces acting on the reciprocable element are balanced. Furthermore, such elimination of side thrust in this transforming of rectilinear reciprocative motion to rotary motion, and vice versa, is effected by mechanism having structural characteristics superior to anything heretofore known for the purpose.

Collaterally with these features, novel refinements are included, by means of which the invention is given satisfactory embodiments. Some of these refinements may be summarized as follows: Easing of gear deadlocks, either by means of angular adjustments or a tilting movement of the shuttle means relative to the line of reciprocation; counterweighting of the rotatable elements or rotors; positioning the counterweights opposite the side occupied by the ball and socket or other connection between the shuttle and rotor, preferably so as to revolve in the plane of rotation thereof; counterbalancing the reciprocative parts at any suitable point or points in the intergearing; positively equalizing the power transmission through the respective reversely rotatable members; operatively interconnecting the reciprocative means and the rotative means for interdependent motion; providing single or multiple casing means in which selective groupings of members of the transforming or intergearing means are lubricated; providing power transmitting elements and ratio-gearing interconnecting the reversely rotatable means; providing fly wheels serving either as rotors or located at any suitable point or points of the intergearing remote from the rotors; providing counterweight means located at any suitable point of the intergearing but effective to counterbalance remote reciprocative parts.

Although specific embodiments are hereinbefore described, the invention is limited only by the scope of the following claims.

Having fully described my invention, what I claim is:

1. Motion transforming mechanism comprising a reciprocable power-transmission element arranged for longitudinal rectilinear reciprocation; means mounting said element for reciprocation relative thereto respective reversely operable rotors mounted at opposite sides of said element on aligned rotative axes which, if elongated, intersect the element normal thereto and intermediate its length; a shuttle mounted on said element and fixed against longitudinal movement relative thereto, said shuttle having oppositely extending and rectilinearly aligned arms which articulatively connect for substantially universal movement with the respective rotors at locations thereof which are disposed remote from and at respectively opposite sides of said aligned rotative axes so that reciprocative movement of said element and said shuttle and rotative movement of said rotors will be interdependent; and gearing rigidly interconnecting the said rotors whereby the lateral forces exerted on the reciprocating element are balanced.

2. The combination recited in claim 1, wherein the interconnecting gearing includes ratio components disposed remote from the rotors.

3. The combination recited in claim 2, wherein the shuttle and rotors are housed in a closed chamber adapted to contain a lubricant, and wherein the interconnecting gearing is housed separately for lubrication.

4. The combination recited in claim 3, wherein the interconnecting gearing comprises a pair of gears concentric with and fixed to the respective rotors for rotation therewith, and a gear train intergearing said gears together.

5. The combination recited in claim 1, wherein the interconnecting gearing comprises a pair of gears fixed to the respective rotors for rotation therewith, and a gear meshing with the gears of said pair in common and providing unidirectional power input or power output.

6. The combination recited in claim 1, wherein the rotors are themselves gears forming part of the interconnecting gearing.

7. The combination recited in claim 1, wherein counterweights are rotatable with the rotary parts for counterbalancing the effective weights of the reciprocating parts.

8. The combination recited in claim 1 wherein the rotors are counterweighted at respective locations diametrically opposite the shuttle connections.

9. The combination recited in claim 1 wherein the interconnecting gearing includes a unidirectional power input or power output gear which is concentric with the power-transmission element.

10. The combination recited in claim 1 wherein the shuttle is connected to the power-transmission element by means of a ball and socket type joint.

11. The combination recited in claim 1 wherein holding means are provided in connection with the power-transmission element for holding said rod against rotative drift.

12. The combination recited in claim 1, wherein the articulative connections of the shuttle arms with the respective rotors comprise respective ball and socket joints, each of which includes a ball slidably and rotatively mounted on the shuttle arm, and a socket carried by the rotor and operative to retain the ball in the plane of rotation of the rotor, the combination being so constructed and arranged that the included angle between a median plane passing transversely through a socket and a perpendicular dropped from the center of articulation thereof normal to the corresponding rotor axis is, at the midpoint of the reciprocative stroke, substantially equal to one-half another angle included between the center line of the corresponding radial arm and the rectilinear prolongation of the corresponding rotor axis.

13. Motion transforming mechanism comprising a reciprocable power-transmission element arranged for rectilinear reciprocation; respective reversely operable rotors mounted at opposite sides of said element on aligned rotative axes which, if elongated, intersect the element normal thereto and intermediate its length; a shuttle rotatively fixed on said element against relative longitudinal movement but for relative transverse oscillation, said shuttle having oppositely extending and rectilinearly aligned arms which articulatively connect for substantially universal movement with the respective rotors at locations thereof which are disposed remote from and at respectively opposite sides of said aligned rotative axes so that reciprocative movement of said element and said shuttle and rotative movement of said rotors will be interdependent; and gearing rigidly interconnecting the said rotors to equalize the respective reverse rotations thereof, said gearing providing for unitary power input or power take-off, and including ratio components disposed remote from the rotors.

14. Motion transforming mechanism comprising a reciprocable power-transmission element arranged for rectilinear reciprocation; respective reversely operable rotors mounted at opposite sides of said element on aligned rotative axes which, if elongated, intersect the element normal thereto and intermediate its length; a shuttle rotatively fixed on said element against relative longitudinal movement but for relative transverse oscillation, said shuttle having oppositely extending and rectilinearly aligned arms which articulatively connect for substantially universal movement with the respective rotors at locations thereof which are disposed remote from and at respectively opposite sides of said aligned rotative axes so that reciprocative movement of said element and said shuttle and rotative movement of said rotors will be interdependent; and gearing rigidly interconnecting the said rotors to equalize the respective reverse rotations thereof, the shuttle and rotors being housed in a closed chamber adapted to contain a lubricant and the interconnecting gearing being housed separately for lubrication.

15. Motion transforming mechanism comprising a reciprocable power-transmission element arranged for rectilinear reciprocation; respective reversely operable rotors mounted at opposite sides of said element on aligned rotative axes which, if elongated, intersect the element normal thereto and intermediate its length; a shuttle rotatively fixed on said element against relative longitudinal movement but for relative transverse oscillation, said shuttle having oppositely extending and rectilinearly aligned arms which articulatively connect for substantially universal movement with the respective rotors at locations thereof which are disposed remote from and at respectively opposite sides of said aligned rotative axes so that reciprocative movement of said element and said shuttle and rotative movement of said rotors will be interdependent; and gearing rigidly interconnecting the said rotors to equalize the respective reverse rotations thereof, the interconnecting gearing comprising a pair of gears concentric with and fixed to the respective rotors for rotation thereof, and a gear train intergearing said gears together.

16. Motion transforming mechanism comprising a reciprocable power-transmission element arranged for rectilinear reciprocation; respective reversely operable rotors mounted at opposite sides of said element on aligned rotative axes which, if elongated, intersect the element normal thereto and intermediate its length; a shuttle rotatively fixed on said element against relative longitudinal movement but for relative transverse oscillation, said shuttle having oppositely extending and rectilinearly aligned arms which articulatively connect for substantially universal movement with the respective rotors at locations thereof which are disposed remote from and at respectively opposite sides of said aligned rotative axes so that reciprocative movement of said element and said shuttle and rotative movement of said rotors will be interdependent; and gearing rigidly interconnecting the said rotors to equalize the respective reverse rotations thereof, said interconnecting gearing including a unidirectional power input or power output gear which is concentric with the power-transmission element.

17. Motion transforming mechanism, comprising shuttle means disposed for oscillatory rotative motion and for simultaneous reciprocatory motion along the axis of oscillation thereof, the shuttle means having a radial arm; mounting means for said shuttle means; rotor means adjacent the shuttle means; and articulative means connecting the said radial arm to the rotor means, said articulative means comprising a ball slidably and rotative mounted on said arm, a socket carried by said rotor and operative to retain the ball in the plane of rotation of said rotor, the aforesaid combination being so constructed and arranged that the included angle between a median plane passing transversely through the socket and a perpendicular dropped from the center of articulation normal to the rotor axis is, at the midpoint of the reciprocative stroke, substantially equal to one-half another angle included between the center line of the said radial arm and the rectilinear prolongation of the rotor axis.

18. Motion transforming mechanism, comprising shuttle means disposed for oscillatory rotative motion and for simultaneous reciprocatory motion along the axis of oscillation thereof, the shuttle means having a radial arm; mounting means for said shuttle means; rotor means adjacent the shuttle means; and articulative means connecting the said radial arm to the rotor means, said articulative means comprising a ball slidably and rotatively mounted on said arm, a socket disposed to operatively retain the ball in the plane of rotation of said rotor, said socket being defined by independent separable members mounted in said rotor, and retaining means for said members; the aforesaid combination being so constructed and arranged that the included angle between a median plane passing transversely through the socket and a perpendicular dropped from the center of articulation normal to the rotor axis is, at the midpoint of the reciprocative stroke, substantially equal to one-half another angle included between the center line of the said radial arm and the rectilinear prolongation of the rotor axis.

19. Motion transforming mechanism, comprising shuttle means disposed for oscillatory motion and for simultaneous reciprocatory motion along the axis of oscillation thereof, the shuttle means having a radial arm; mounting means for said shuttle means; rotor means adjacent the shuttle means; and articulative means connecting the said radial arm to the rotor means, said articulative means comprising a ball slidably and rotatively mounted on said arm, a socket disposed to operatively retain the ball in the plane of rotation of said rotor, said socket being defined by two rings mounted in said rotor and disposed in face-to-face engagement along a median plane passing transversely through the socket, and retaining means for said rings; the aforesaid combination being so constructed and arranged that the included angle between the said median plane and a perpendicular dropped from the center of articulation normal to the rotor axis is at the midpoint of the reciprocative stroke, substantially equal to one-half another angle included between the center line of the said radial arm and the rectilinear prolongation of the rotor axis.

20. The combination recited in claim 19, wherein passage means are defined at the face-to-face meeting of said rings, for the passage of lubricant; wherein the ball has a plurality of passages leading from the outer surface thereof to the slideway which receives the said radial-arm, said passage being arranged to register intermittently with said passage means of the socket; and wherein means are provided for supplying lubricant to the said passage means of the socket.

21. The combination recited in claim 20 wherein the said shuttle means, rotor means, and articulative means are mounted within a housing adapted to retain a quantity of lubricant; and wherein passage means are provided for conducting the said lubricant to the passage means of the socket.

22. In combination, a piston; a cylinder within which said piston is operable; a piston rod to which said piston is rigidly secured, said piston rod being arranged for longitudinal, rectilinear reciprocation; respective reversely operable rotors mounted at opposite sides of said piston rod on aligned rotative axes which, if elongated, intersect the piston rod normal thereto and intermediate its length; a shuttle mounted on said piston rod and fixed against longitudinal movement relative thereto, said shuttle having oppositely extending and rectilinearly aligned arms which articulatively connect for substantially universal movement with the respective rotors at locations thereof which are disposed remote from and at respectively opposite sides of said aligned rotative axes so that reciprocative movement of said rotors will be interdependent; and gearing rigidly interconnecting the said rotors, whereby the lateral forces exerted on the reciprocating element are balanced.

JAMES A. HARDMAN.

REFERENCES CITED

The following references are of record in the file of this patent:

UNITED STATES PATENTS

| Number | Name | Date |
|---|---|---|
| 570,871 | Douthett | Nov. 3, 1896 |
| 781,219 | Mills | Jan. 31, 1905 |
| 816,215 | Burger | Mar. 27, 1906 |
| 1,040,063 | Wall | Oct. 1, 1912 |
| 1,233,924 | Selby | July 17, 1917 |
| 1,392,389 | Anderson | Oct. 4, 1921 |
| 1,496,490 | Powell | June 3, 1924 |
| 1,716,971 | Miller | June 11, 1929 |

FOREIGN PATENTS

| Number | Country | Date |
|---|---|---|
| 312,876 | Italy | Nov. 28, 1933 |
| 472,035 | Great Britain | Sept. 15, 1937 |